(12) United States Patent
Shavit et al.

(10) Patent No.: US 8,230,421 B2
(45) Date of Patent: Jul. 24, 2012

(54) EFFICIENT NON-BLOCKING K-COMPARE-SINGLE-SWAP OPERATION

(75) Inventors: Nir N. Shavit, Cambridge, MA (US); Mark S. Moir, Somerville, MA (US); Victor M. Luchangco, Arlington, MA (US)

(73) Assignee: Oracle America, Inc., Redwood City, CA (US)

( * ) Notice: Subject to any disclaimer, the term of this patent is extended or adjusted under 35 U.S.C. 154(b) by 1319 days.

(21) Appl. No.: 11/864,667

(22) Filed: Sep. 28, 2007

(65) Prior Publication Data

US 2008/0109608 A1    May 8, 2008

Related U.S. Application Data

(62) Division of application No. 10/670,495, filed on Sep. 24, 2003, now Pat. No. 7,293,143.

(60) Provisional application No. 60/413,231, filed on Sep. 24, 2002.

(51) Int. Cl.
*G06F 9/46* (2006.01)
*G06F 12/00* (2006.01)
*G06F 13/00* (2006.01)
*G06F 13/28* (2006.01)

(52) U.S. Cl. ........ 718/100; 718/104; 711/147; 711/150; 711/151; 711/154; 711/155

(58) Field of Classification Search .................. None
See application file for complete search history.

(56) References Cited

U.S. PATENT DOCUMENTS

| 4,584,640 A | 4/1986 | MacGregor et al. |
| 4,847,754 A | 7/1989 | Obermarck et al. |
| 5,224,215 A | 6/1993 | Disbrow |

(Continued)

FOREIGN PATENT DOCUMENTS

EP    0366585    5/1990

(Continued)

OTHER PUBLICATIONS

Greenwald et al, "The Synergy Between Non-blocking Synchronization and Operating System Structure", Standford University, 1996, pp. 123-136.*

(Continued)

*Primary Examiner* — Emerson Puente
*Assistant Examiner* — Charles Swift
(74) *Attorney, Agent, or Firm* — Robert C. Kowert; Meyertons, Hood, Kivlin, Kowert & Goetzel, P.C.

(57) ABSTRACT

The design of nonblocking linked data structures using single-location synchronization primitives such as compare-and-swap (CAS) is a complex affair that often requires severe restrictions on the way pointers are used. One way to address this problem is to provide stronger synchronization operations, for example, ones that atomically modify one memory location while simultaneously verifying the contents of others. We provide a simple and highly efficient nonblocking implementation of such an operation: an atomic k-word-compare single-swap operation (KCSS). Our implementation is obstruction-free. As a result, it is highly efficient in the uncontended case and relies on contention management mechanisms in the contended cases. It allows linked data structure manipulation without the complexity and restrictions of other solutions. Additionally, as a building block of some implementations of our techniques, we have developed the first nonblocking software implementation of load-linked/store-conditional that does not severely restrict word size.

20 Claims, 2 Drawing Sheets

U.S. PATENT DOCUMENTS

| | | | |
|---|---|---|---|
| 5,428,761 | A | 6/1995 | Herlihy et al. |
| 6,128,710 | A * | 10/2000 | Greenspan et al. ........... 711/152 |
| 6,144,965 | A | 11/2000 | Olivier |
| 6,178,423 | B1 | 1/2001 | Douceur et al. |
| 6,223,335 | B1 * | 4/2001 | Cartwright et al. ........... 717/100 |
| 6,360,219 | B1 * | 3/2002 | Bretl et al. ............................. 1/1 |
| 6,360,220 | B1 * | 3/2002 | Forin .................................... 1/1 |
| 6,366,932 | B1 | 4/2002 | Christenson |
| 6,581,063 | B1 | 6/2003 | Kirkman |
| 6,651,146 | B1 | 11/2003 | Srinicas et al. |
| 6,826,757 | B2 * | 11/2004 | Steele et al. .................. 719/314 |
| 7,293,143 | B1 | 11/2007 | Shavit et al. |
| 2001/0047361 | A1 | 11/2001 | Martin et al. |
| 2003/0065892 | A1 | 4/2003 | Bonola |
| 2003/0105943 | A1 | 6/2003 | Yeh et al. |
| 2003/0140085 | A1 * | 7/2003 | Moir et al. ..................... 709/107 |
| 2003/0174572 | A1 * | 9/2003 | Moir et al. ............... 365/230.03 |
| 2003/0182462 | A1 | 9/2003 | Moir et al. |
| 2003/0182465 | A1 | 9/2003 | Moir et al. |
| 2003/0217115 | A1 * | 11/2003 | Rowlands ..................... 709/214 |
| 2003/0236817 | A1 * | 12/2003 | Radovic et al. ............... 709/107 |
| 2004/0015510 | A1 | 1/2004 | Moir et al. |
| 2004/0015642 | A1 | 1/2004 | Moir et al. |
| 2004/0034673 | A1 | 2/2004 | Moir et al. |
| 2004/0153687 | A1 | 8/2004 | Moir et al. |
| 2005/0086452 | A1 * | 4/2005 | Ross .............................. 712/34 |
| 2006/0218556 | A1 | 9/2006 | Nemirovsky et al. |

FOREIGN PATENT DOCUMENTS

| | | |
|---|---|---|
| EP | 0466339 | 1/1992 |
| WO | 86/00434 | 1/1986 |
| WO | 01/53942 | 7/2001 |
| WO | 01/53943 | 7/2001 |
| WO | 01/80015 | 10/2001 |
| WO | 01/82057 | 11/2001 |
| WO | 03/060705 | 7/2003 |
| WO | 03/060715 | 7/2003 |

OTHER PUBLICATIONS

Jayant et al, "Efficient and Practical Constructions of LL/SC Variables", Jul. 2003, ACM, pp. 285-294.*

Moir, "Laziness Pays! Using Lazy Sybchronization Mechanisms to Improve Non-Blocking Constructions", 2000, ACM, pp. 1-19.*

Luchangco et al, "Nonblocking k-compare-single-swap" Jun. 2003, ACM, pp. 1-10.*

Moir, "Practical Implementations of Non-Blocking Synchronization Primitives", 1997, ACM, pp. 219-228.*

Turek et al, "Locking without Blocking: Making Lock Based Concurrent Data Structure Algorithms Nonblocking", 1992, ACM, pp. 212-222.*

Shann et al, "A practical nonblocking queue algorithm using compate-and-swap", 2000, IEEE, pp. 470-475.*

Valois, "Lock-free Linked Lists Using Compare-and-Swap". 1995, RPI, pp. 1-10.*

Jensen et al, "A new approach to exclusive data access in shared memory multiprocessors", 1986, 15th Internatioal symposium on Computer Architecture, pp. 1-13.*

Harris, "A pragmatic implementation of non-blocking linked list", 2001, University of Cambridge, pp. 1-16.*

Herlihy, "Wait-Free Synchronization", 1991, ACM, pp. 124-149.*

U.S. Appl. No. 11/864,574, filed Sep. 28, 2007.

U.S. Appl. No. 11/864,624, filed Sep. 28, 2007.

U.S. Appl. No. 11/864,649, filed Sep. 26, 2007.

Timothy L. Harris, et al., "A Practical Multi-Word Compare-and-Swap Operation," 2002, University of Cambridge, 13 pages.

Agesen, et al., "DCAS-Based Concurrent Deques," SPAA 2000. Proceedings of the 12th Annual ACM Symposium on Parallel Algorithms and Architectures, pp. 137, 146, ACM Press, ISBN: 1-58113-185-2, 2000.

Detlefs, et al., "Even Better DCAS-Based Concurrent Deques," Lecture Notes in Computer Science, vol. 1914, pp. 59-73, Springer-Verlag, Berlin, German, ISBN: 3-540-41143-7, 2000.

Herlihy, et al., "Linearizability: A Correctness Condition for Concurrent Objects," ACM Transactions on Programming Languages and Systems, 12(3): 463-492, Jul. 1990.

Herlihy, "Wait-Free Synchronization," ACM Transactions on Programming Languages and Systems, 11(1): 124-149, Jan. 1991.

Massalin, et al., "A Lock-Free Multiprocessor OS Kernel," Technical Report TR CUCS-005-9, Columbia Univ., New York, NY, 1991, 21 pages.

Massalin, "Synthesis: An Efficient Implementation of Fundamental Operating System Services," 158 pages, 1992.

Bershad, "Practical Considerations for Highly Concurrent Data Objects," Proceedings 13th IEEE International Conference on Distributed Computing Systems, pp. 264-273, IEEE Computer Society Press, 1993.

Herlihy, "A Methodology for Implementing Highly Concurrent Data Objects," ACM Transactions on Programming Languages and Systems, 15(5):745-770, Nov. 1993.

Attiya, et al., "Are Wait-Free Algorithms Fast?," Journal of the ACM, 41(4):725-763, Jul. 1994.

Lamarca, "A Performance Evaluation of Lock-Free Synchronization Protocols," Proceedings of the 13th Annual ACM Symposium on Principles of Distributed Computing, pp. 130-140, ACM Press, 1994.

Michael, et al., "Simple, Fast, and Practical Non-Blocking and Blocking Concurrent Queue Algorithms," Proceedings of PODC, pp. 267-275, May 1996.

Attiya, et al., "Universal Operations: Unary Versus Binary," Proceedings of the 15th Annual ACM Symposium on Principles of Distributed Computing, pp. 223-232, ACM Press, 1996.

Greenwald, et al., "The Synergy Between Non-Blocking Synchronization and Operating System Structure," Proceedings of the 2nd Symposium on Operating Systems Design and Implementation, pp. 123-136, Usenix Association, 1996.

Afek, et al., "Disentangling Multi-Object Operations," Proceedings of the 16th Annual ACM Symposium on Principles of Distributed Computing, pp. 111-120, Aug. 1997.

Arora, et al., "Thread Scheduling for Multiprogrammed Multiprocessors," Proceedings of the 10th Annual ACM Symposium on Parallel Algorithms and Architecture, pp. 119-129, ACM Press, 1998.

Attiya, et al., "Atomic Snapshots in O(n log n) Operations," SIAM Journal on Computing, 27(2):319-340, Apr. 1998.

Greenwald, "Non-Blocking Synchronization and System Design," PhD Thesis, Technical Report STAN-CS-TR-99-1624, Aug. 1999, 241 pages.

Turek, John et al., "Locking without Blocking: Making Lock Based Concurrent Data Structure Algorithms Nonblocking", 11th ACM SIGACT—SIGMOND-SIGART Symposium on Principles of Database Systems, 1992.

Afek, Yehuda et al., "Long-Lived Renaming made Adaptive", 18th Annual ACM Symposium on Principles of Distributed Computing, pp. 91-104, 1999.

Agesen, Ole et al., "An Efficient Meta-Lock for Implementing Ubiquitous Synchronization," ACM SIGPLAN Notices, vol. 34, No. 10, pp. 207-222, Oct. 1999.

Attiya Hagit et al., "An Adaptive Collect Algorithm with Applications", Dept. of Computing Science, The Technion, Israel, May 10, 2001.

Barnes, Greg, "A Method for Implementing Lock-Free Shared Data Structures", 5th Annual ACM Symposium on Parallel Algorithms and Architectures, pp. 261-270, 1993.

Herlihy, Maurice, "Dynamic-Sized Lockfree Data Structures", Sun Microsysems Technical Report SMLI TR-2002-112, Jun. 2002.

Herlihy, Maurice et al., "The Repeat Offender Problem: A Mechanism for Supporting Dynamic-Sized Lock-Free Data Structures", Sun Microsystems Technical Report SMLI TR-2002-112, Jun. 2002.

Herlihy, Maurice et al., "Obstruction-Free Synchronization: Double-Ended Queues as an Example" 23rd International Conference on Distributed computing, May 2003.

Israeli, Amos et al., "Disjoint-Access-Parallel Implementations of Strong Shared Memory Primitives", 13th Annual ACM Symposium on Principles of Distributed Computing, pp. 151-160, 1994.

More, et al., "Wait-Free Algorithms for Fast, Long-Lived Renaming," Science of Computer Programming, vol. 25, No. 1, pp. 1-39, Aug. 1995.

More, "Practical Implementation of NOn-Blocking Synchronization Primitives," Proceedings of the 16th Annual Symposium on Principles of Distributed Computing, pp. 219-228, ACM Press, 1997.

More, "Transparent Support for Wait-Free Transactions," Proceedings of the 11th International Workshop on Distributed Algorithms, pp. 305-319, Springer-Verlag, 1997.

More, "Laziness Pays! Using Lazy Synchronization Mechanisms to Improve Non-Blocking Constructions," Proc. 19th Annual ACM Symposium on Principles of Distributed Computing, pp. 61-70, ACM Press, 2000.

Shavit, et al., "Software Transactional Memory," Distributed Computing, vol. 10, No. 2, pp. 99-116, Feb. 1997.

Shavit, et al., "Combining Funnels: A New Twist on an Old Tale . . . ," Proceedings of the 17th Annual ACM Symposium on Principals of Distributed Computing, pp. 61-70, ACM Press, 1998.

Shavit, et al., "Combining Funnels: A Dynamic Approach to Software Combining," Journal of Parallel and Distributed Computing, vol. 60, No. 11, pp. 1355-1387, Nov. 2000.

Treiber, "Systems Programming: Coping with Parallelism," IBM Technical Report RJ5118, Apr. 23, 1986.

Afek, "Atomic Snapshots of Shared Memory," Journal of the ACM, vol. 40, No. 4, pp. 873-890, 1993.

Agesen, et al., "DCAS-Based Concurrent Deques," Theory of Computing Systems., vol. 35, No. 3, pp. 349-386, May 2002.

Anderson, et al., "Universal Constructions for Large Objects," IEEE Transactions on Parallel and Distributed Systems, vol. 10, No. 12, pp. 1317-1332, 1999.

Detlefs, et al., "Lock-Free Reference Counting," Proc. 20th Annual ACM Symposium on Principles of Distributed Computing, pp. 190-199, ACM Press, 2001.

Herlihy, et al., "Transactional Memory: Architectural Support for Lock-Free Data Structures," Proc. 20th International Symposium in Computer Architecture pp. 289-300, IEEE Computer Society, Washington, DC, 1993.

Lamport, "A Fast Mutual Exclusion Algorithm," ACM Transactions on Computer Systems, vol. 5, No. 1, pp. 1-11, 1987.

Luchangco, et al., "Nonblocking k-compare-single-swap," Proceedings of the 15th Annual ACM Symposium on Parallel Algorithms and Architectures, pp. 314-323, ACM Press, 2003.

Michael, et al., "Safe Memory Reclamation for Dynamic Lock-Free Objects Using Atomic Reads and Writes," Proceedings of the 21st Annual ACM Symposium on the Principles of Distributed Computing, pp. 21-30, ACM Press, 2002.

* cited by examiner

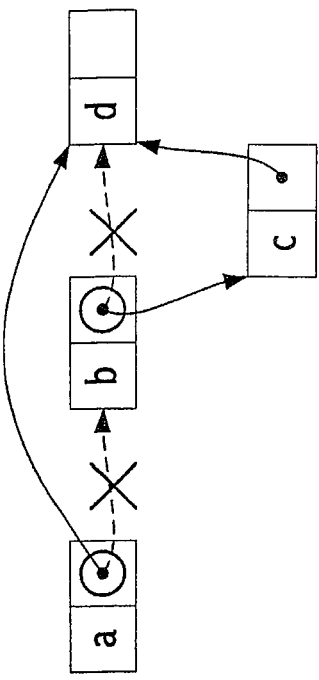
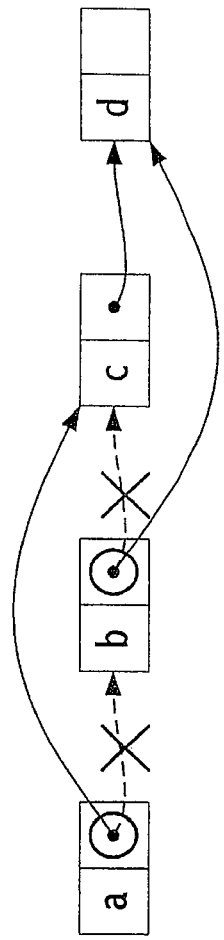
```
P:  delete(b)
    ... CAS(&a.next,b,d) ...
Q:  insert(c)
    ... CAS(&b.next,d,c) ...
```
FIG. 1A
FIG. 1B
```
P:  delete(b)
    ... CAS(&a.next,b,c) ...
Q:  delete(c)
    ... CAS(&b.next,c,d) ...
```
FIG. 2A
FIG. 2B

EFFICIENT NON-BLOCKING K-COMPARE-SINGLE-SWAP OPERATION

CROSS-REFERENCE TO RELATED APPLICATION(S)

This application is a divisional of U.S. application Ser. No. 10/670,495, filed Sep. 24, 2005, which claims priority, under 35 U.S.C. §119(e), of U.S. Provisional Application No. 60/413,231, filed 24 Sep. 2002, naming Nir Shavit, Mark S. Moir, Victor Luchangco as inventors.

BACKGROUND

1. Field of the Invention

The present invention relates generally to coordination amongst execution sequences in a multiprocessor computer, and more particularly, to techniques for facilitating implementations of concurrent data structures and/or programs.

2. Description of the Related Art

Interest in atomic multi-location synchronization operations dates back at least to the Motorola MC68030 chip, which supported a double-compare-and-swap operation (DCAS). See generally, Motorola, MC68030 User's Manual, Prentice-Hall (1989). A DCAS operation generalizes a compare-and-swap (CAS) to allow atomic access to two locations. DCAS has also been the subject of recent research. See e.g., O. Agesen, D. Detlefs, C. Flood, A. Garthwaite, P. Martin, M. Moir, N. Shavit, and G. Steele, *DCAS-based Concurrent Deques*, Theory of Computing Systems, 35:349-386 (2002); D. Detlefs, P. Martin, M. Moir, and G. Steele, *Lock-free Reference Counting*, Distributed Computing, 15(4):255-271 (2002); and M. Greenwald, *Non-Blocking Synchronization and System*, Design, Ph.D. Thesis, Stanford University Technical Report STAN-CS-TR-00-1624 (1999).

In general, the implementation of concurrent data structures is much easier if one can apply atomic operations to multiple non-adjacent memory locations. However, despite the early MC68030 support for DCAS and despite some research interest multi-location synchronization, current processor architectures, by and large, support atomic operations only on small, contiguous regions of memory (such as a single or double word).

As a result, the current literature offers two extremes of nonblocking software synchronization support for concurrent data structure design: intricate designs of specific structures based on single-location operations such as compare-and-swap (CAS), and general-purpose multi-location transactional memory implementations. While the former are sometimes efficient, they are invariably hard to extend and generalize. The latter are flexible and general, but typically costly.

In an early paper, Herlihy and Moss described transactional memory, a more general transactional approach where synchronization operations are executed as optimistic atomic transactions in hardware. See M. Herlihy and J. E. B. Moss, *Transactional Memory: Architectural Support for Lock-free Data Structures*, In *Proc. 20th Annual International Symposium on Computer Architecture* (1993).

Barnes proposed a software implementation of a K-location read-modify-write. See e.g., G. Barnes, *A Method for Implementing Lock-free Shared Data Structures*, In *Proc. 5th ACM Symposium on Parallel Algorithms and Architectures*, pp. 261-270 (1993). That implementation, as well as those of others (see e.g., J. Turek, D. Shasha, and S. Prakash, *Locking without Blocking: Making Lock-based Concurrent Data Structure Algorithms Nonblocking*, In *Proc. 11th ACM Symposium on Principles of Database Systems*, pp. 212-222 (1992); A. Israeli and L. Rappoport, *Disjoint-Access-Parallel Implementations of Strong Shared Memory Primitives*, In *Proc. 13th Annual ACM Symposium on Principles of Distributed Computing*, pp. 151-160 (1994)) was based on a cooperative method where threads recursively help all other threads until an operation completes. Unfortunately, this method introduces significant overhead as redundant "helping" threads do the work of other threads on unrelated locations because a chain of dependencies among operations exists.

Shavit and Touitou coined the term software transactional memory (STM) and presented the first lock-free implementation of an atomic multi-location transaction that avoided redundant "helping" in the common case, and thus significantly outperformed other lock-free algorithms. See N. Shavit and D. Touitou, *Software Transactional Memory*, Distributed Computing, 10(2):99-116 (1997). However, the described formulation of STM was restricted to "static" transactions, in which the set of memory locations to be accessed was known in advance.

Moir, Luchangco and Herlihy have described an obstruction-free implementation of a general STM that supports "dynamic" multi-location transactions. See commonly-owned, co-pending U.S. patent application Ser. No. 10/621,072, entitled "SOFTWARE TRANSACTIONAL MEMORY FOR DYNAMICALLY SIZABLE SHARED DATA STRUCTURES" filed 16 Jul. 2003 naming Mark S. Moir, Victor Luchangco and Maurice Herlihy as inventors. Moir, Luchangco and Herlihy have also described an obstruction-free implementation of a multi-location compare-and-swap (KCAS) operation, i.e., a k-location compare-and-swap on non-adjacent locations. See commonly-owned, co-pending U.S. patent application Ser. No. 10/620,747, entitled "OBSTRUCTION-FREE MECHANISM FOR ATOMIC UPDATE OF MULTIPLE NON-CONTIGUOUS LOCATIONS IN SHARED MEMORY" filed 16 Jul. 2003 naming Mark S. Moir, Victor Luchangco and Maurice Herlihy as inventors.

While such obstruction-free implementations can avoid helping altogether, thereby reducing the algorithm complexity of the algorithm and eliminating associated overheads, further reductions are desired. Indeed, the strong semantics of the aforementioned techniques, e.g., full multi-location transaction support, generally come at a cost. Further, full multi-location transaction support may be overkill for some important software applications such as linked-list manipulations. What is needed is reasonably efficient, though potentially-weaker, multi-location operations that are general enough to reduce the design complexities of algorithms based on CAS alone.

SUMMARY

We have developed an obstruction-free implementation of an atomic k-location-compare single-swap (KCSS) operation. Amongst other things, KCSS allows for simple non-blocking manipulation of linked data structures by overcoming a key algorithmic difficulty in their design: i.e., making sure that while a pointer is being manipulated, neighboring parts of the data structure remain unchanged. Our implementation is efficient in the typical uncontended case. For example, in some realizations, a successful k-location KCSS operation employs only two CAS operations, two stores, and 2k noncached loads when there is no contention. Our techniques are supportable using a variety of single-location atomic read-modify-write operations, such as CAS, LL/SC, etc. Accordingly, we believe that our results lend themselves to efficient and flexible nonblocking manipulations of list-based data structures using synchronization mechanisms available on many current processor architectures. Finally, while KCSS operation semantics provide a useful descriptive context for our techniques, these techniques apply more generally to transactions that read multiple locations but modify only a single location.

In addition, as a building block for some implementations of our techniques, we have developed a mechanism for emulating load-linked (LL) and store-conditional (SC) operations for use in an LL/SC synchronization construct. One interesting exploitation is to provide LL/SC synchronization in a processor that does not directly support load-linked and store-conditional operations. For example, our techniques may be used to provide emulation for LL/SC synchronization (e.g., to support data structures and software designed for LL/SC synchronization) on a processor architecture that supports CAS operations. Alternatively, our techniques may be employed to provide LL/SC synchronization with stronger semantics than provided by the LL and SC operations directly supported by a particular processor.

BRIEF DESCRIPTION OF THE DRAWINGS

The present invention may be better understood, and its numerous objects, features, and advantages made apparent to those skilled in the art by referencing the accompanying drawings.

FIGS. 1A and 1B illustrate certain hazards that exist in attempts to implement, using single-location CAS, nonblocking insertion and deletion operations on a linked list.

FIGS. 2A and 2B illustrate certain hazards that exist in attempts to implement, using single-location CAS, nonblocking deletion operations on a linked list.

The use of the same reference symbols in different drawings indicates similar or identical items.

DESCRIPTION OF THE PREFERRED EMBODIMENT(S1

Terminology

Figure 3:
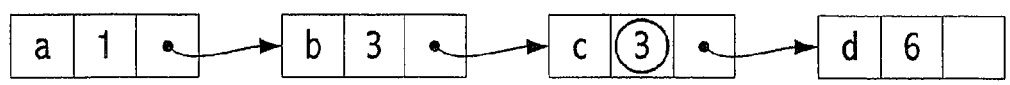
FIGS. 3, 4 and 5 illustrate respective uses of exemplary KCSS operations to simplify the design of a linked-list construct to support multiset operations.

A shared data structure is a collection of data that can be accessed using an associated set of operations. A traditional way to implement a shared data structure is to use mutual exclusion (locks) to ensure that multiple operations do not concurrently access (the same part of) the data structure concurrently. This approach has many disadvantages, as discussed in numerous papers in the literature. A significant amount of research over the last decade or so has focused on designing nonblocking shared data structures, which preclude the use of locks and thereby avoid their associated disadvantages.

Typically, two nonblocking conditions, lock-freedom and wait-freedom, have been considered in the literature. In this description, we focus on a new nonblocking condition, obstruction-freedom, that we now define, in part, through contrast with the more conventionally understood nonblocking conditions.

Lock-freedom: An implementation of an operation is lock-free if after a finite number of steps of any execution of that operation, some operation execution completes (irrespective of the timing behavior of any concurrent operation executions).

Wait-freedom: An implementation of an operation is wait-free if after a finite number of steps of any execution of that operation, that operation execution completes (irrespective of the timing behavior of any concurrent operation executions).

A shared data structure is lock-free or wait-free if all its operations are lock-free or wait-free respectively. Much of the difficulty associated with designing lock-free and wait-free shared data structures is that when concurrent operations interfere with each other, we must ensure that at least one of them makes progress (all of them, in the wait-free case). Obstruction-freedom relaxes this requirement. We explain in the next section why obstruction-freedom is a useful property despite its weaker progress guarantees.

Obstruction-freedom: An implementation of an operation is obstruction-free if every operation execution that executes in isolation after some point completes after a finite number of steps.

Observe that all three properties preclude the use of locks for synchronization because, if an operation acquires a lock and then fails, any other operation that requires that lock can never complete, regardless of how many steps it takes, even if it runs alone.

As applied to transactions, the definitions above need to be extended slightly to preclude the possibility that every attempt to commit any transaction fails. Specifically, we have the following nonblocking definitions for transactions.

Wait-free transactions: A transaction implementation is wait-free if all its operations are wait-free and any thread that repeatedly attempts to commit transactions eventually performs a successful commit.

Lock-free transactions: A transaction implementation is lock-free if all its operations are lock-free and if some thread repeatedly attempts to commit transactions, then eventually some thread performs a successful commit.

Obstruction-Free transactions: A transaction implementation is obstruction-free if all its operations are obstruction-free and if some thread repeatedly attempts to commit transactions, and runs in isolation after some point, then it eventually performs a successful commit.

Obstruction-Free Implementations

Clearly, obstruction-freedom is a weaker property than lock-freedom and wait-freedom. Here, we explain why we believe that it is nonetheless an important property to consider.

First, we believe that obstruction-free implementations are likely to be substantially simpler to design than lock-free and especially wait-free ones. This has numerous benefits including ease of modification, ease of verification, etc. In this specification, we describe the first nonblocking implementation of dynamic software transactional memory (STM); our implementation guarantees obstruction-freedom but not lock-freedom. It is simpler and more efficient than lock-free implementations of static STM.

Second, in some scenarios, we can exploit properties of the environment to ensure that every obstruction-free operation execution completes. For example, in a uniprocessor where threads are scheduled by time slice, relatively short obstruction-free operations may be guaranteed to run alone for long enough to complete. Another example is in priority-scheduled uniprocessors: an operation runs in isolation unless it is preempted by a higher priority operation.

Third, in some scenarios, we might reason that, even though the system does not guarantee operations will run in isolation for long enough to complete, we may determine by analysis or experiments that the "livelock" scenario that lock-freedom precludes but obstruction-freedom admits does not occur in practice.

Finally, an obstruction-free implementation can be augmented with a variety of different mechanisms that attempt to control the interactions between concurrent operations in order to ensure that operations eventually complete. A simple example is to use "backoff." Using this approach, operations wait before retrying upon encountering interference. Various schemes can be chosen for deciding how long to wait. One choice is a combination of randomization and exponential back off, which is very likely to cause operations to run long enough in isolation to complete. Such schemes can be effective for improving the performance of lock-free implementations by reducing contention, and we expect that they will be similarly effective in allowing obstruction-free operations to complete. Other "out of band" contention reduction mechanisms can also be employed, including mechanisms yet to be developed. The beauty of our approach is that the obstruction-free implementations themselves will not have to be modified (and therefore will not have to be reverified) in order to use a different contention reduction mechanisms.

Other possible approaches include queuing and time stamping approaches, in which threads agree amongst themselves to "wait" for each other to finish. While simplistic applications of these ideas would give rise to some of the same problems that the use of locks does, we have much more freedom in designing more sophisticated approaches for contention reduction than when using locks, because correctness is not jeopardized by interrupting an operation at any time and allowing another operation to continue execution. We expect that contention between operations will typically be quite rare, and that repeated retries will rarely be necessary. In scenarios where this is true, we benefit from the simple and efficient obstruction-free designs and only rarely invoke the more heavy-weight contention reduction mechanisms. In contrast, in most lock-free and wait-free implementations, the mechanisms that are used to ensure the respective progress properties impose significant overhead in the typical case.

Accordingly, building on these insights, we have developed simple, efficient nonblocking implementations of single-modification transactions, including nonblocking implementations structured as an atomic k-location-compare single-swap (KCSS) operation. KCSS verifies the contents of k locations and modifies one of them, all as a single atomic operation. One implementation of KCSS, when executed without contention, requires only two CAS operations, two stores, and 2k non-cached loads. It requires no memory barriers under the TSO memory model.

The nonblocking progress condition that our implementation meets is obstruction-freedom. As detailed above, obstruction-freedom is a progress condition that tends to simplify the design of nonblocking algorithms by removing the need to provide strong progress guarantees in the algorithm itself (as required by wait-freedom or lock-freedom). Simply put, obstruction-freedom guarantees a thread's progress if other threads do not actively interfere for a sufficient period. The definition is thus geared towards the uncontended case, handling contended cases through orthogonal contention management mechanisms. Lock-based algorithms are not obstruction-free because a thread trying to acquire a lock can be blocked indefinitely by another thread that holds the lock. On the other hand, a lock-free algorithm is also obstruction-free because lock-freedom guarantees progress by some thread if some thread continuously take steps.

A Motivating Example: Manipulating: Linked Data Structures

KCSS is a natural tool for linked data structure manipulation; it allows a thread, while modifying a pointer, to check atomically that related nodes and pointers have not changed. An exploitation of general applicability is the implementation of nonblocking linked data structures with arbitrary insertions and deletions.

Examples presented in FIGS. 1A and 1B and in FIGS. 1A and 1B illustrate some of the hazards that exist in straightforward (though ultimately naive) attempts to implement, using single-location CAS, nonblocking insertion and deletion operations on a simple linked list. The examples are meant to illustrate that CAS-based manipulation of a list is hard. Circled locations indicate the target addresses of CAS operations; crossed out pointers are the values before a CAS succeeds.

In the example of FIGS. 1A and 1B, process (or thread) P is deletes node b from the list, while process (or thread) Q concurrently attempts to insert node c into the list. FIG. 1A illustrates partial sequences of instructions corresponding to processes P and Q, each including a CAS operation intended to facilitate concurrent access to the list. FIG. 1B illustrates the unintended results of the concurrent access; node c is not inserted in the list, but rather linked from deleted node b. FIGS. 2A and 2B illustrate an analogous competition between deleting processes. Process (or thread) P is deletes node b from the list while process (or thread) Q concurrently attempts to delete node c. FIG. 2B likewise illustrates the unintended results of the concurrent access; node c is not deleted from the list, but rather remains linked from node a.

In short, the naive CAS based implementations simply do not work. Although effective (and rather ingenious) nonblocking algorithms do exist for ordered list-based sets (see e.g., T. Harris, A Pragmatic Implementation of Non-blocking Linked Lists, In Proc. 15th International Symposium on Distributed Computing (2001); and M. Michael, *High Performance Dynamic Lock-free Hash Tables and List-based Sets*, In Proc. 14th Annual ACM Symposium on Parallel Algorithms and Architectures, pages 73-82 (2002)), these algorithms do not generalize easily to arbitrary linked data structures. For example, it is not clear how to modify these algorithms to implement multisets.

By employing KCSS instead of CAS, we can simplify the design of arbitrary nonblocking linked-list operations. In particular, KCSS allows us to confirm that other pointers of the illustrated lists remain unchanged at a linearization point at which we atomically perform the single swap used to effectuate the insert or delete operation. Furthermore, more complex data structures may also be supported.

Figure 4:
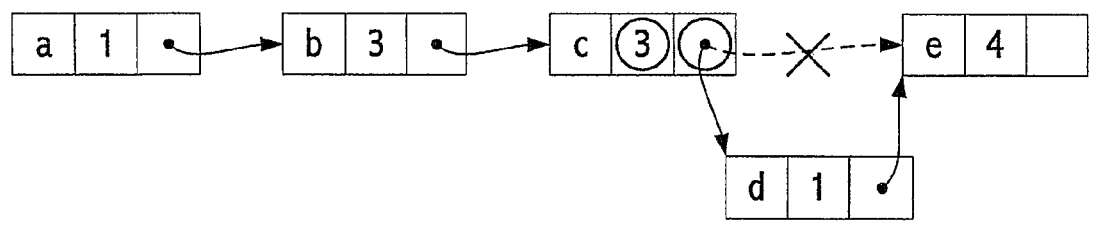
Figure 5:
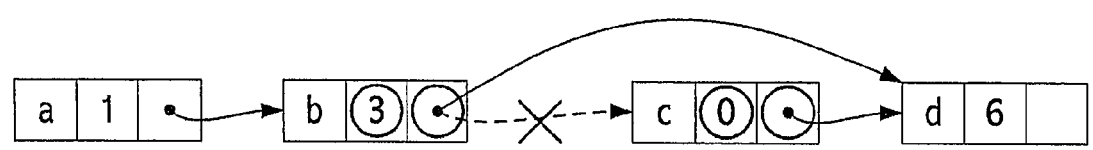

FIGS. 3, 4 and 5 illustrate how the use of KCSS can significantly simplify the design of a linked-list construct to support multiset operations. Each element in the multiset (i.e., an element with nonzero multiplicity) is represented by a node in the list, which stores the element's multiplicity in a count field. Inserts or deletes of such elements respectively increment or decrement the count (FIG. 3). Two- and four-location KCSS operations are used to add and remove nodes by swapping one pointer, while confirming nearby nodes have not changed (FIGS. 4 and 5). For simplicity, the illustrated implementation uses a 4CSS operation to make sure the adjacent nodes have not changed during node removal. We can achieve the same purpose using KCSS operations that access only two locations at the cost of a slightly more intricate algorithm. However, adding a small number of additional locations to a KCSS operation is not prohibitive because, as illustrated below, the cost of verifying each additional location is quite low, only two noncached loads. In many cases, this is a reasonable tradeoff.

In designing some implementations of our KCSS algorithm, we provide a simple and novel implementation of load-linked/store-conditional (LL/SC) using CAS synchronization; this implementation improves on previous results in that it can accommodate pointer values on all common architectures. In particular, ABA avoidance tags or ids need not be encoded integrally with pointer representations. We believe this algorithm is of independent significance: it extends the applicability of LL/SC-based algorithms to all common architectures that support CAS.

Preliminaries

A k-location-compare single-swap (KCSS) operation takes k locations $a_1 \ldots a_k$, k expected values $e_1 \ldots e_k$, and a new value $n_1$. If the locations all contain the expected values, the KCSS operation atomically changes the first locational $a_1$ from $e_1$ to $n_1$ and returns true; in this case, we say that the KCSS succeeds. Otherwise, the KCSS returns false and does not modify any memory location; in this case we say that it fails. In the next section, we present an implementation for KCSS using particular read, load-linked (LL), store-conditional (SC) and snapshot operations that we have also implemented. In this section, we describe more precisely the interface and semantics of the various operations, the correctness requirements, and our assumptions about the system.

Operation Semantics

We now describe the semantics of the operations for which we provide implementations in the next section. We consider a collection of locations. At any point in time, each location has an abstract value from a set of application values. As explained below, our implementation assumes some mild restrictions on this set.

A KCSS(k,a[1 ... k], expvals[1 ... k], newval) operation returns false if for some $i \in [1,k]$, the abstract value of location a[i] differs from expvals[i]. If this operation returns true, then it also changes the abstract value of location a[1] to newval. The locations specified by a must all be distinct.

READ(a) and LL(a) operations return the abstract value of location a. An LL operation of thread p is said to be outstanding until p invokes an SC operation on the same location. The behavior of all operations is undefined if LL or KCSS invoked by process p while p has an outstanding LL operation on any location. While, it is straightforward to remove this restriction (see e.g., M. Moir, *Practical Implementations of Non-blocking Synchronization Primitives*, In Proc. 16th Annual ACM Symposium on Principles of Distributed Computing, pp. 219-228 (1997) (presenting an efficient technique for generalizing LL/SC implementations so that LL/SC sequences can be executed concurrently on different locations)), retaining it simplifies our presentation. Accordingly, for simplicity of description and without limitation, we assume that LL and SC are used in pairs on the same location.

The behavior of an SC(a) operation S by process p is undefined if it is invoked before any LL(a) operation by process p has completed, or if there is not a previous LL(a) operation L by process p such that there is no LL, SC or KCSS operation invoked by process p between L and S. Otherwise, an SC(a) operation by process p returns true only if no other operation that changes the abstract value of location a has occurred since the preceding LL(a) operation by process p. We say that a SC operation succeeds if it returns true, and fails otherwise. To ensure that this operation is useful for implementing obstruction-free data structures, we further require that an SC(a) operation succeeds if no other operation that accesses location a takes a step between the invocation of p's preceding LL(a) operation and the completion of the SC(a) operation. Observe that this specification allows a concurrent READ(a) operation to cause a SC(a) operation to fail; in fact, it would do so in our implementation. Although this possibility does not jeopardize obstruction-freedom, eliminating it would allow some concurrent operations to succeed that would otherwise fail, and thus, may be desirable. As later described, our implementation can easily be modified to come close to this goal.

A SNAPSHOT(m, a[1 ... m]) operation returns an array V [1 ... m] such that, for each $i \in [1,m]$, V[i] is the abstract value of location a[i]. The locations specified by a must be distinct.

Correctness Condition

Below we present obstruction-free, linearizable implementations of the operations described above. Linearizability implies that each operation appears to take effect instantaneously at some point between its invocation and its response; this point is the operation's linearization point. Obstruction-freedom requires that if a thread p executes an operation, and after some point p runs without interference for long enough, then that operation will terminate.

Interoperability with Dynamic Data Structures and Memory Management

In our implementations of the above operations, each location initially holds its initial abstract value. Thus, locations can be dynamically allocated and initialized by a single thread, which is important for dynamic-sized data structures. Our implementations also allow a location to be freed if no operation that specifies this location as an argument is executing or will be invoked. Furthermore, they guarantee that there will always be a pointer to an object that could be accessed in the future. Thus, our operations do not affect memory management, and in particular, data structures based on our implementations "play nicely" with garbage collection and nonblocking memory management techniques. The garbage collector would need to be modified slightly to distinguish between pointers and tagged ids, which are described below.

System Model

We assume a machine architecture (typically a shared memory multiprocessor) that supports linearizable load, store, and CAS operations. It is straightforward to transform these algorithms to work in systems that provide LL and SC rather than CAS. In this case, native LL and SC operations should be directly used to replace the use of CAS in our implementations. Native LL and SC operations do not replace our implementations of the LL and sc operations because our implementations of these operations include additional functionality designed to be compatible with the SNAPSHOT operation. Appropriate LL/SC for CAS substitutions are known in the art (see e.g., M. Moir, *Practical Implementations of Non-blocking Synchronization Primitives*, In Proc. 16th Annual ACM Symposium on Principles of Distributed Computing, pp. 219-228 (1997)).

The semantics of a CAS operations will be understood with reference to the following atomic code fragment:

```
bool CAS(loc *a, value expval, value newval){
    atomically{
        if (*a != expval)
            return false;
        *a = newval;
        return true;
    }
}
```

Although we assume linearizability, our algorithms are correct on multiprocessors that provide only the TSO memory model, without adding memory barrier instructions; this is a side effect of the way we use CAS.

An Exemplars Implementation

We now describe our implementations of the READ, LL, SC, SNAPSHOT, and KCSS operations. We begin by explaining a restricted version of the LL, SC, and READ operations, which is correct if we need only these operations. We then explain how LL can be modified slightly to support a simple SNAPSHOT operation. Finally we explain how we implement KCSS using LL, SC, and SNAPSHOT.

Recall that an SC(a,v) operation by process p should succeed only if no other operation that modifies location a is linearized between the linearization points of p's preceding LL(a) operation and p's SC(a,v) operation. To overcome the ABA problem, previous implementations of LL/SC from CAS have employed special "tags" or "version numbers" to be stored together with the application value in a location that can be accessed by CAS. This requirement severely restricts the range of values that can be stored by those SC implementations, and in particular, makes these implementations inapplicable for storing pointers in many architectures.

Our goal is to design implementations that place much milder restrictions on the set of application values, in particular so that our implementations can access pointers on all common multiprocessor architectures. Below we specify these restrictions, which are too weak to allow tag/version number techniques, and then explain how we can achieve our implementations despite these weaker restrictions.

Each location can store either an application value or a tagged process id. The abstract value of a location that contains an application value is always that value; when the location contains a tagged id, it is a little more complicated, as we explain below. A tagged process id (tagged id for short) contains a process id and a tag.

The only restriction we place on application values is that we have some way to distinguish them from tagged ids. One simple way to achieve this when the application value of interest is a pointer is to "steal" the low-order bit to mark tagged ids: we can arrange that all locations are aligned on even byte boundaries so that the low-order bit of every pointer is zero (locations that will be targets of CAS instructions are usually required to be word-aligned anyway).

For convenience, we treat tags as if they were unbounded integers. In today's 64-bit architectures, we can use one bit to distinguish tagged ids, 15 bits for the process id and 48 bits for the tag, which is more than enough to avoid the ABA problem that potentially arises as the result of tags wrapping around.

LL and SC

We now explain a simplified version of our implementations of the LL and SC operations using the code that follows.

```
typedef struct loc_s {
    taggedid_t tid; // used for SNAPSHOT
    value_t val; // atomically CASable
} loc_t;
void RESET (loc_t *a) {
 1: value_t oldval = a->val;
 2: if (TAGGED-ID(oldval))
 3:     CAS(&a->val, oldval, VAL_SAVE[ID(oldval)]);
}
value_t LL (loc_t *a) {
 4: while (true) {
 5:     INC_MY_TAGGED_ID; // increment local tag
 6:     value_t val = READ (a);
 7:     VAL_SAVE [MY_ID] = val;
 8:     if (CAS(&a->val, val, MY_TAGGED_ID)) {
 9:         a->tid = MY_TAGGED_ID; // needed for SNAPSHOT
10:         return val;
        }
    }
}
```

```
bool SC(loc_t *a, value_t newval) {
11: return CAS(&a->val, MY_TAGGED_ID, newval);
}
value_t READ (loc_t *a) {
12: while (true) {
13:     value_t val = a->val;
14:     if (!TAGGED_ID(val)) return val;
15:     RESET(a);
    }
}
```

For the purposes of this simplified version, the reader should ignore the tid field of the location record (i.e., a location record is simply a memory location that contains an application value or a tagged id), and any code that accesses it, namely line 9.

In order to implement LL(a) and SC(a,v) operations for process p, we need a way to determine whether the abstract value of location a has changed since the LL(a) operation was linearized. Our approach is to have p's LL (a) operation store a previously unused tagged id in location a (line 8). We ensure that the tagged id is new by having p maintain a local tag, which it increments each time it needs a new tagged id (line 5). As explained below, we do not allow any operation that changes the abstract value of location a to be linearized while the tagged id of another process is in that location. Thus, if the SC(a,v) operation changes the contents of location a from the tagged id stored by the preceding LL(a)f the same process to v (i.e., the CAS in line 11 succeeds), then it changes the abstract value of location a to v while ensuring that the abstract value of location a has not changed since the previous LL (a) operation, as required.

To guarantee obstruction-freedom, it is not sufficient to prevent other operations from being linearized between the linearization points of p's LL (a) and SC(a,v) operations: we must guarantee that a thread that runs without interference will make progress. Therefore, it must be possible for a concurrent operation to remove p's tagged id from location a (thereby causing p's SC to fail), without changing the abstract value of location a; this is achieved by the auxiliary RESET operation, which is explained below. To make this possible, before attempting to store a new tagged id in location a, p's LL (a) operation first stores the application value it intends to replace with its tagged id (line 6) in a special location VAL_SAVE [p] (line 7). (Recall that p can have at most one outstanding LL operation, so a single location is sufficient.) For now, we can consider the abstract value of a location that contains a tagged id of process p to be VAL_SAVE [p]. Thus, it is easy to see that when p's LL(a) operation replaces the application value in location a with a tagged id (line 8), the abstract value of location a does not change. Similarly, another operation that uses CAS to remove p's tagged id can correctly determine the abstract value of location a in order to replace p's tagged id with the correct abstract value by reading VAL_SAVE [p] (line 3). (Process p does not change VAL_SAVE [p] while any location contains its tagged id. Also, there is no ABA problem when either p or another process removes p's tagged id from location a, because p uses a fresh tagged id each time it stores a tagged id in location a and only process p stores a tagged id with p's process id.)

This completes the description of the LL(~a)n d SC(~,Vop) erations, except that we have not explained the READ(ˆ) operation, which is used by LL(~( ) line 6).

READ

The READ operation determines the abstract value of location a. It first reads location a (line 13). If the value read is an application value, then this was the abstract value of location a when line 13 was executed, so it can be returned (line 14). Otherwise, the abstract value of location a when line 13 was executed was VAL_SAVE [p] here p is the process whose id is in the tagged id read at line 13. Simply reading that location would not necessarily provide the correct abstract value of location a because p might have changed the contents of this location since the READ(a) operation executed line 13. However, because there can be no ABA problem on tagged ids, the READ(a) operation could read VAL_SAVE [p] and then reread location a to confirm that the same tagged id is still in location a. In this case, it could correctly linearize a read of the abstract value of location a at any point between the two reads of location a. If we wanted to support only LL, SC, and READ operations, this would be correct and would allow a location to be read without causing a concurrent LL/SC sequence on the same location to fail. However, in code above, if a READ operation encounters a tagged id, it calls RESET in order to attempt to set location a back to its abstract value. As explained later, this is useful to support the SNAPSHOT and KCSS operations that are presented next.

SNAPSHOT

We have adapted a well-known nonblocking technique, see Y. Afek, H. Attiya, D. Dolev, E. Gafni, M. Merritt, and N. Shavit, *Atomic Snapshots of Shared Memory*, Journal of the ACM (JACM), 40(4):873-890 (1993), to obtain an atomic snapshot of a number of locations. We repeatedly "collect" (i.e., read each location individually and record the values read) the values from the set of locations until we encounter a collect in which none of the values collected has changed since it was read in the previous collect. In this case, it is easy to see that, when the first value is read in the last collect, all of the values read during the previous collect are still in their respective locations. A tricky detail is how to determine that a value has not changed since the last time it was read. Because of the ABA problem, it is not sufficient to simply determine that the two values read were the same: the location's value may have changed to a different value and then changed back again between these two reads. As explained below, we can determine a value has not changed using the tid field (which we have been ignoring until now) associated with each location. This field serves the same purpose as the tags (or version numbers) discussed earlier. However, our implementation does not require them to be modified atomically with the val field, and therefore does not restrict applicability, as discussed earlier.

Exemplary code for SNAPSHOT follows.

```
Value_t[l..m] COLLECT_VALUES(int m, (loc_t *) a[l..m]){
    Value_t V[l..m];
S1: for (i = 1; i <= m; i++) V[i] = READ(a [i]);
S2: return V;
}
tag_t[l..m] COLLECT_TAGGED_IDS(int m, (loc_t *) a[l..m]){
    taggedid_t T[l..m];
S3: for (i = 1; i <= m; i++) T[i] = a[I]->tid;
S4: return T;
1
value_t[l..m] SNAPSHOT(int m, (loc_t *) [l..m] a){
    taggedid_t TA[l..m], TB[l..m];
    value_t VA[l..m], VB[l..m];
S5: while (true) {
S6:     TA[l..m] = COLLECT_TAGGED_IDS(m,a);
S7:     VA[l..m] = COLLECT_VALUES(m,a);
S8:     VB[l..m] = COLLECT_VALUES(m,a);
S9:     TB[l..m] = COLLECT_TAGGED_IDS(m,a);
S10:    if (for all i, (TA[i] == TB[i]) &&
                       (VA[i] == VB[i]))
```

-continued

```
S11:        return VA;
        }
}
```

Observe that the basic structure (if we ignore tags for a moment longer) is essentially as described above: we collect the set of values twice (lines S7 and S8) and retry if any of the values changed between the first read and the second (line S10). Observe further that COLLECT_VALUES uses READ to read the value of each location. Thus, it ensures that the abstract value it reads from a location a is stored in location a itself. As described earlier, for the abstract value of a location to change, some process must install a fresh tagged id in that location and subsequently change that tagged id to the new abstract value. This entire sequence must occur between the READ in the first collect and the READ in the second. Therefore, line 9 of the LL operation, which stores the fresh tagged id in the tid field of the location, must be executed between the first and second reads of the tid field by the SNAPSHOT operation, which will therefore retry (see lines S6 and S9). This argument is simple, but it depends on the fact that READ resets a location that contains a tagged id. Below, we explain how our implementation can be modified to avoid this requirement.

KCSS

Our KCSS implementation can be built using the operations described above and will be understood with reference to the exemplary code that follows:

```
bool KCSS(int k, (loc_t *) a[l..k],
         value_t expvals [l..k], value_t newval) {
    value_t oldvals [l..k];
K1: while (true) {
K2:     oldvals [l] = LL(a[l]);
K3:     oldvals[2..k] = SNAPSHOT(k-l,a[2..k]);
K4:     if (for some i, oldvals[I] != expvals[i]) {
K5:         SC(a[l], oldvals [l]);
K6:         return false;
        }
        // try to commit the transaction
K7:     if (SC(a[l], newval)) return true;
    } // end while
}
```

The implementation itself is straightforward, but the linearization argument is trickier. The basic idea is to use LL and sc to change the value of location a[l] from expvals[l] to newval (lines K2 and K7), and to use SNAPSHOT to confirm that the values in locations a[2 . . . k] match expvals[2 . . . k] (lines K3 and K4). If any of the k values is observed to differ from its expected value (line K4), then the KCSS and returns false, as required (line K6). However, before returning, it attempts to restore a[l] to expvals[l] using SC (line K5), so that the previous LL operation is no longer outstanding, and thus, the process may subsequently invoke another LL or KCSS operation.

If the sc in line K7 succeeds, then we know that the abstract value of location a[l] is expvals[l] for the entire interval between the linearization point of the LL in line K2 and the linearization point of the SC in line K7. In particular, this holds at the linearization point of the SNAPSHOT called in line K3, when the abstract values of a[2 . . . k] match expvals [2 . . . k]. Thus, we can linearize the successful KCSS operation at that point. This is where the linearization argument becomes slightly tricky: The actual value in location a[l] does not change to newval until the SC in line K7 is linearized.

However, the abstract value of that location changes at the linearization point of the KCSS operation, which occurs earlier. Therefore, if any other operation observes the abstract value of that location between the linearization points of the SNAPSHOT in line K3 and the SC in line K7, it will see the wrong abstract value and the implementation will not be linearizable. To prevent this problem, we require READ to reset a location, rather than simply reading the VAL_SAVE entry of the process whose tagged id is in the location, and then confirming that the tagged id is still in the location (as described earlier). This ensures that no process observes the wrong abstract value in the interval between the SNAPSHOT and the successful SC. As described below, we can relax this requirement somewhat; we have presented our implementations without these modifications in order to keep the presentation simple and clear.

Variations

We have presented a simple and efficient nonblocking implementation of a dynamic collection of locations that supports READ, LL, SC, SNAPSHOT and KCSS operations. We have also explained a simple extension by which we can support transactions that modify at most one location. These operations form a powerful set of tools for designing relatively simple obstruction-free implementations of important shared data structures such as linked lists. Because of the way in which we solve the ABA problem, our implementation is more efficient, more flexible, and more widely applicable for implementing linked data structures than the techniques used in recent direct implementations of lock-free linked lists.

From the basic ideas we have presented in this paper, numerous possible optimizations, extensions, and generalizations are possible. We describe a few of them here.

Optimizing READ

Our READ operation can be optimized by observing that if the CAS in line 3 thereof succeeds, then we have already determined the abstract value of the location being accessed, which can be returned immediately without rereading.

Improving Concurrency

As stated earlier, we can modify our implementation so that READ does not always have to reset a location that contains a tagged id: in some cases, reading a value from the VAL_SAVE location of the process whose tagged id is encountered, and then confirming that the tagged id is still in the location is sufficient to determine the correct abstract value. This does not work, however, in cases in which we linearize a modification to the location accessed by a LL/SC pair at a point other than the linearization point of the SC operation. In the operations we have presented, this is the case only for LL/SC sequences that are part of a higher-level KCSS operation. Therefore, if we extend the interface of LL so that the invoker can specify whether or not this is a "dangerous" use of LL/SC, then this information could be stored in the tagged id. Thus, READ could reset only when it encounters such LL/SC sequences, while allowing other, simpler uses of LL/SC to proceed concurrently.

This modification would complicate the SNAPSHOT implementation slightly. Recall that the argument given earlier for the linearizability of SNAPSHOT operations depends on READ always resetting a location if it contains a tagged id. This can be overcome by having SNAPSHOT also collect the tagged ids from locations for which it has determined values without resetting the location. As this would be done only if the tagged id is in the location on behalf of a nondangerous LL/SC sequence, the abstract value of the location does not change before that tagged id is removed from the location, so it is sufficient for SNAPSHOT to confirm that it has not.

DCSS and CAS

To implement a double-compare single-swap (DCSS) operation (i.e., KCSS with k=2), we can replace the SNAPSHOT of k−1=1 location in our KCSS implementation with a simple READ. Similarly, for a CAS on these locations, which is simply a KCSS operation with k=1, the snapshot can be eliminated entirely.

In some cases, such as the multiset example mentioned earlier, locations that support only read, CAS and DCSS operations are sufficient. In cases such as this one, we can eliminate the t id field (and the code that accesses it), as this field was used only for the SNAPSHOT operation. We can also implement CAS by using the native CAS instruction, resetting the location if it contains a tagged id.

Optimizations to SNAPSHOT and KCSS

The implementation of SNAPSHOT can be improved at the cost of muddying the presentation slightly. For example, the tags collected at line S9 can be used for the first set of tags in the next iteration (we collect the tags again in the next iteration at line S6). Also, one can eliminate a complete sequence of reads from the snapshot, at the cost of a slightly more complex proof. We can also improve the performance of the KCSS by breaking the snapshot abstraction (for example, there is no need to take an entire snapshot if one of the early values read does not match the expected value).

Single Modification Transactions

We chose the KCSS API to demonstrate our ideas because its semantics is easy to state and understand. However, the ideas presented here can be extended to support transactions that modify only a single location. The basic idea is to have transactional loads record the information collected in the first half of the snapshot in our KCSS implementation, and transactional commit do the second half of the snapshot to determine if any of the values read had been modified by a concurrent operation since being read by the transactional load. Interestingly, the implementation of this stronger semantics would actually be somewhat more efficient than using READ and KCSS for the same purpose, because the READs and the first half of the snapshot in KCSS are collapsed together into the transactional load. It would also be straightforward to provide a transactional "validate" operation that rechecks the values read so far in the transaction.

We believe that the ability provided by KCSS to "confirm" the abstract value of some locations, while modifying another, will significantly reduce the impact of ABA issues on algorithm designers. However, such issues may still arise in some cases, and implementing the transactions as discussed above would completely relieve designers of the burden of dealing with this problem.

Other Embodiments

While the invention(s) is(are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

In some embodiments, the current invention may comprise a computer program product embodied in one or more computer readable media.

Many variations, modifications, additions, and improvements are possible. For example, while application to particular concurrent shared objects and particular implementations thereof have been described, applications to other shared objects and other implementations will also be appreciated by persons of ordinary skill in the art. While much of description herein has focused on compare and swap (CAS) based synchronization, other synchronization primitives may be employed. For example, based on the description herein, persons of ordinary skill in the art will appreciate that other suitable constructs, including load-linked and store-conditional operation pairs (LL/SC) may be employed, as well. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A system, comprising:
   a processor, and
   memory coupled to the processor, wherein the memory comprises program instructions executable by the processor to implement a compare and swap (CAS) based non-blocking load-linked/store-conditional (LL/SC) synchronization, wherein the synchronization includes:
   a load-linked sequence comprising a first CAS operation; and
   a store-conditional sequence comprising a second CAS operation;
   and wherein the synchronization targets a location containing an application value that does not include a version indication encoded integrally therewith.

2. The system of claim 1,
   wherein, by operation of the load-linked sequence comprising the first CAS operation, an application value present in a targeted location is displaced by a tagged id.

3. The system of claim 2,
   wherein the tagged id is distinguishable from an application value and includes a version indication encoded integrally therewith.

4. The system of claim 2,
   wherein the tagged id is distinguishable from a pointer value for aligned access to memory using a low-order bit position unused for the aligned access.

5. The system of claim 2,
   wherein the tagged id identifies an auxiliary location in which the displaced application value is stored.

6. The system of claim 2,
   wherein the tagged id corresponds to a process or thread that successfully completed the load-linked sequence.

7. The system of claim 2,
   wherein, by operation of the store-conditional sequence that includes the second CAS operation, the tagged id value present in the targeted location is displaced by a different application value.

8. The system of claim 1,
   wherein the application value includes a literal value.

9. The system of claim 1,
   wherein the application value includes a pointer value.

10. The system of claim 1,
    wherein the program instructions are executable to provide, as part of an application programming interface (API), a callable interface to the load-linked and store-conditional sequences.

11. A computer program product embodied in one or more non-transitory computer readable, the product comprising program instructions executable to implement:
    a load-linked operation that reads an application value associated with a targeted location, stores the read application value in an auxiliary location associated with an id, and stores the id, in the targeted location using a first linearizable synchronization operation, wherein the read application value does not include a version indication encoded integrally therewith; and
    a store-conditional operation that employs a second linearizable synchronization operation to ensure that the read application value has not changed since success of the first linearizable synchronization operation.

12. The computer program product of claim 11, wherein the program instructions are executable to implement:
    a read sequence that distinguishes between an application value and an instance of an id and, if the targeted location encodes the id, retrieves the associated application value from the associated auxiliary location.

13. The computer program product of claim 11, wherein the program instructions are executable to implement:
    a reset sequence that distinguishes between an application value and an instance of an id and, if the targeted location encodes the id, retrieves the associated application value from the associated auxiliary location.

14. The computer program product of claim 11,
    wherein one or both of the first and second linearizable synchronization operations include a compare and swap (CAS) operation.

15. The computer program product of claim 11,
    wherein one or both of the first and second linearizable synchronization operations include an atomic read-modify-write operation.

16. The computer program product of claim 11,
    wherein the computer readable media includes at least one medium selected from the set of: a disk, a tape, a magnetic medium, an optical medium, or an electronic storage medium.

17. The computer program product of claim 11,
    combined with a shared memory multiprocessor that does not directly support load-linked and store-conditional instructions but rather supports an alternative atomic read-modify-write synchronization operation, the resulting combination supporting LL/SC synchronization of application code without integrally encoding a version indication with the application value.

18. The computer program product of claim 17,
    combined with the application code.

19. A non-transitory computer-accessible storage medium storing program instructions that when executed on a shared-memory multiprocessor:

perform a multithreaded computation that includes load-linked and store-conditional operations; and implement a non-blocking load-linked/store-conditional (LL/SC) synchronization construct comprising load-linked and store-conditional sequences using one or more atomic read-modify-write instructions, wherein the shared memory multiprocessor does not directly support load-linked and store-conditional instructions, and wherein application values stored in a location targeted by the LL/SC synchronization construct do not include a version indication encoded integrally therewith.

20. The non-transitory computer-accessible storage medium of claim 19, wherein the load-linked sequence reads an application value associated with a targeted location, stores the read value in an auxiliary location associated with an id and stores, using a first one of the atomic read-modify-write instructions, the id in the targeted location, and wherein the store-conditional sequence employs a second one of the atomic read-modify-write instructions to ensure that the application value associated with the targeted location has not changed since success of the first linearizable synchronization operation.

* * * * *